June 20, 1961 D. R. YOUNG 2,989,732

TIME SEQUENCE ADDRESSING SYSTEM

Filed May 24, 1955

3 Sheets-Sheet 1

*INVENTOR.*
DONALD R. YOUNG

*BY* William V. Schilberg

AGENT

June 20, 1961 D. R. YOUNG 2,989,732

TIME SEQUENCE ADDRESSING SYSTEM

Filed May 24, 1955 3 Sheets-Sheet 2

INVENTOR.
DONALD R. YOUNG

BY William V. Schellberg

AGENT

June 20, 1961 D. R. YOUNG 2,989,732

TIME SEQUENCE ADDRESSING SYSTEM

Filed May 24, 1955 3 Sheets-Sheet 3

*INVENTOR.*
DONALD R. YOUNG

*BY*
William V. Schellberg
AGENT

United States Patent Office 2,989,732
Patented June 20, 1961

2,989,732

TIME SEQUENCE ADDRESSING SYSTEM

Donald R. Young, Poughkeepsie, N.Y., assignor to International Business Machines Corporation, New York, N.Y., a corporation of New York Filed May 24, 1955, Ser. No. 510,701
6 Claims. (Cl. 340—172.5)

This invention relates to devices of the type employed for storage of binary information and is directed in particular to an address selection system for writing into and interrogating storage elements arranged in a coordinate array.

In accordance with the invention, a time sequence selection system is provided through the use of pulse delay means which couple one or more coordinate dimensions of such an array wherein at least two dimensions determine a particular storage element address. The storage elements employed may be magnetic devices, ferroelectric capacitors or any medium which exhibits like characteristics. Ferroelectric capacitors and magnetic cores are particularly adapted for this purpose as they attain two distinct states of stable remanence capable of representing binary digits.

One broad object of the invention is to provide a system arrangement whereby a single storage element in a coordinately arranged memory array may be selectively addressed.

Another object is to provide an improved method for selectively causing a particular remanence state to be attained by a storage element and subsequently detecting the state of storage or binary representation that has been stored.

A more specific object of the invention is to provide a time sequence selection system for reading and writing at random addresses in a coordinate array of storage elements comprising ferroelectric capacitors or saturable magnetic cores.

Still another object of the invention is to provide an arrangement for selectively controlling the remanence state of a magnetic core or a ferroelectric capacitor by application of coincident voltage pulses with selection of a particular storage element in a coordinate array determined by the time of pulse application.

Another object is to provide a selection system for an array employing time sequence addressing in at least one coordinate dimension and space addressing in another coordinate dimension.

Other objects of the invention will be pointed out in the following description and claims and illustrated in the accompanying drawings, which disclose, by way of example, the principle of the invention and the best mode, which has been contemplated, of applying that principle.

Figure 2A:
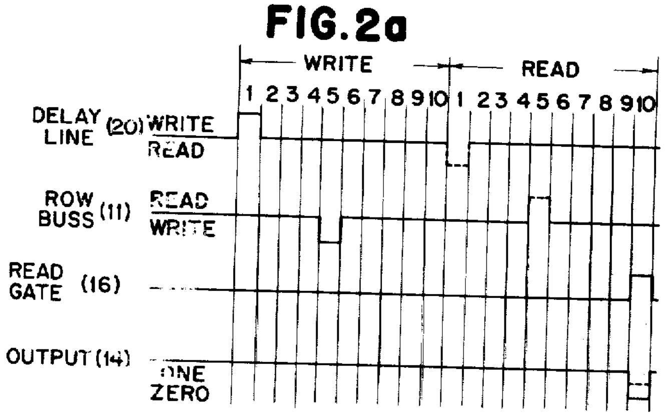
FIGURE 2 is a diagram illustrating time sequence addressing as applied to one dimension of a two dimensional array with space selection applied to the other dimension.
Figure 2:
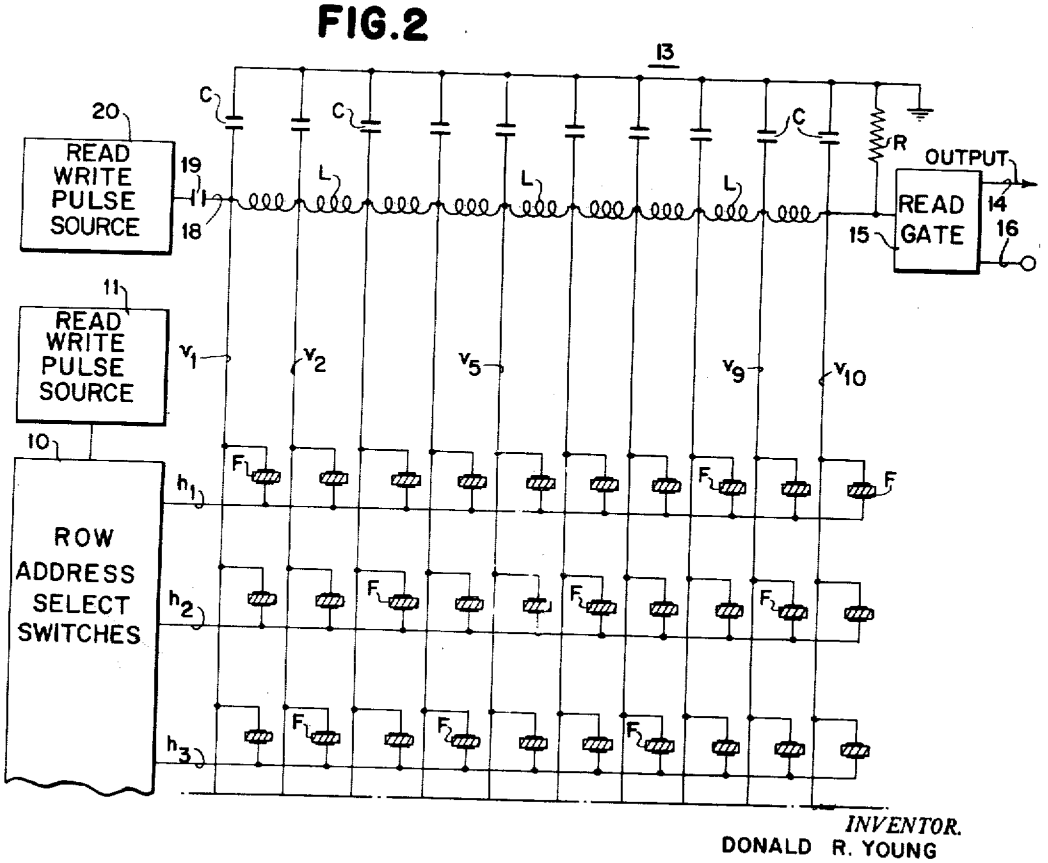

FIGURE 2*a* is a time chart illustrating the application of timed impulses for control of the array of FIGURE 2.

Figure 3:
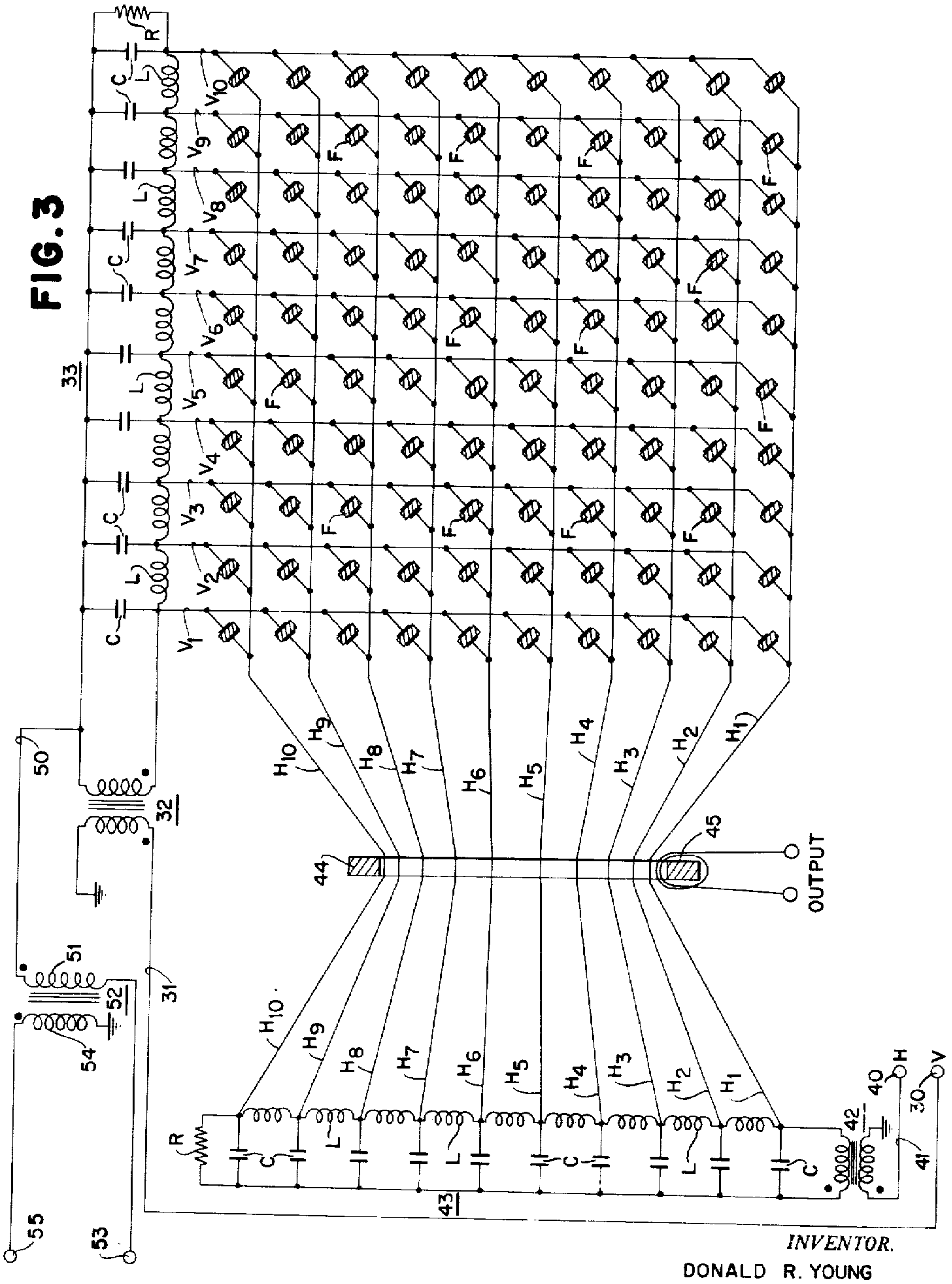

FIGURE 3 is a schematic circuit diagram illustrating time sequence addressing as applied to a two dimensional memory array of ferroelectric storage capacitors.

Figure 3A:
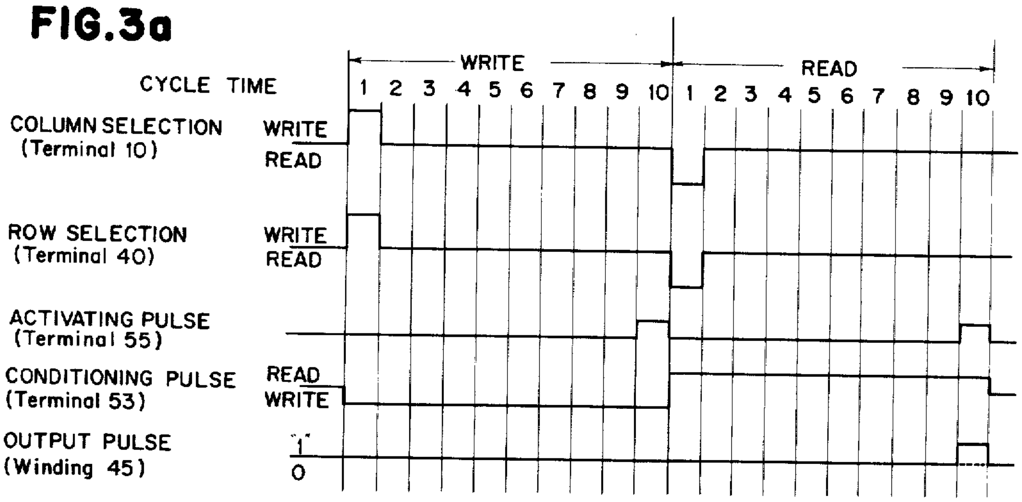

FIGURE 3*a* is a timing diagram showing the period of application of electrical impulses suitable for controlling operation of the circuit of FIGURE 3.

Figure 4:
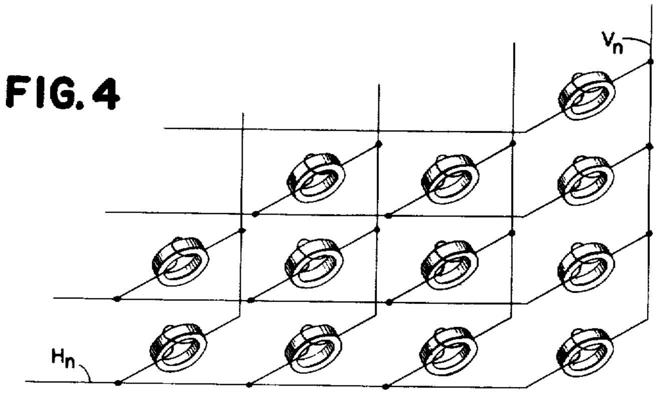

FIGURE 4 illustrates a partial array of saturable magnetic core storage elements.

Figure 5:
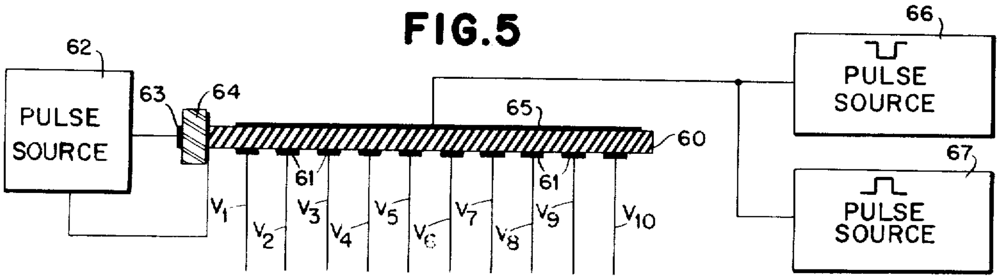

FIGURE 5 is a schematic illustration of a ferroelectric pulse delay medium.

In ferroelectric capacitors such as those employed in memory systems, materials having substantially rectangular hysteresis loops and low coercive force are desired. The hysteresis loop for a barium titanate crystal of this type is similar to the curve shown in FIG. 1 where the verticl axis represents the electrical displacement or degree of polarization and the horizontal axis represents the electric field strength, which is proportional to the voltage applied across the terminals of the capacitor. In storing binary information, the state of polarization designated "*b*" is arbitrarily selected as representing a binary zero and state "*a*" then represents storage of a binary one. With a ferroelectric capacitor in the zero representing state "*b*," application of a positive pulse causes the hysteresis loop to be traversed from point "*b*" to point "*c*," which is the saturation point, and, on removal of this applied electric field, returns to point "*a*" at which it remains in a stable condition representing a binary one. A negative pulse is applied on read-out and, with the capacitor in a state representing a stored binary one, the hysteresis curve is traversed from the point "*a*" to point "*d*" and, when the pulse terminates, goes to point "*b*." The slope of the hysteresis curve between points "*a*" and "*d*" is relatively great and, as the slope is proportional to the effective capacitance of the ferroelectric condenser, the change in polarization in going from point "*a*" to point "*d*" presents a large capacitance to the negative read-out pulse. Application of the negative read-out pulse in interrogating a capacitor which is in a binary zero representing state causes the hysteresis curve to be traversed from point "*b*" to point "*d*" and, on termination of the read-out pulse, returns to point "*b*." The slope of the hysteresis curve between points "*b*" and "*d*" is small and this change in polarization therefore presents a low capacitance to the negative read-out pulse.

The points "*a*" and "*b*" are stable states of polarization and binary information thus represented and stored in the dielectric will remain for a considerable period without requiring application of energy from an external source for its maintenance. At the stable points "*a*" and "*b*," there is no net field within the ferroelectric condenser or external to it and the polarization charge is equal and opposite to the surface charge. Consequently, conduction through the dielectric does not destroy the information and the external leads may even be shorted without ill effects or loss of information.

An electric field applied to the terminals of a ferroelectric condenser must exceed the coercive force to cause a change in the state of polarization, however, potentials applied to each individual terminal may be less than the coercive force with the total potential across the capacitor of a magnitude such as to exceed the coercive force.

Figure 1:
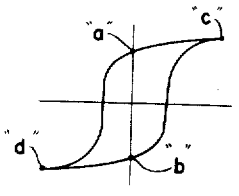
FIGURE 1 is a diagrammatic representation of the hysteresis curve of a storage element such as a ferroelectric capacitor or saturable magnetic core of the type employed in the systems illustrated.

The curve shown in FIGURE 1 may also represent the hysteresis characteristic of a saturable magnetic core with the vertical axis being the flux density and the horizontal axis the applied magnetomotive force. With a core in the residual state "*b*" and representing a binary zero, a binary one is stored by application of a force greater than the coercive force through windings embracing the core and driving it in a positive sense toward point "*c*." On termination of this force the core attains point "*a*" and remains at this point until a negative magnetomotive force is applied sufficient to drive the core to point "*d*." With the arbitrary representation chosen, a negative force is applied for read out and, if a particular core is at state "*b*," the shift occurs from point "*b*" to point "*d*" and then back to "*b*." If a core is storing a binary zero and the read out pulse is applied, there is a low impedance presented to the pulse by the core winding whereas if the core is storing a one and shifts from one remanence state to the other, a high impedance is presented so that a determination of the stored state may be made by comparison of the impedance of the winding to the read out signal.

A matrix of storage elements may be selectively addressed through space coordinates as shown in the copending application of D. R. Young, Serial No. 392,615, filed Nov. 17, 1953, for ferroelectric capacitors, now Patent No. 2,869,111 and as shown in the copending application of R. Counihan, Serial No. 440,983, filed July 2, 1954, for magnetic cores now Patent No. 2,902,677; both applications being assigned to the same assignee as the present application. The input-output circuitry of such systems may be simplified by conversion to a time sequence address in lieu of an address in space through the employment of pulse delay means. This reduction in circuitry is obtained at the expense of access time, however, with actuating impulses of one quarter microsecond duration spaced by a like interval, this time may be made within reasonable limits. In accordance with the invention, time sequence addressing may be applied to two or three dimensional memory arrays with any one or all dimensions selected by timed impulses.

Referring now to FIG. 2, an addressing system is illustrated which employs time sequence selection in one dimension combined with space addressing in the other dimension as adapted to a two dimensional array of ferroelectric capacitors. Individual capacitors F are connected between one of a plurality of vertical busses *v* and one of a plurality of horizontal busses *h*. The *h* busses are coupled to an address switch 10, which may be a conventional crystal diode matrix for example, wherein one of the busses $h_1$—$h_n$ is selected for activation by a row address read-write pulse source 11. The vertical busses $v_1$—$v_n$ are coupled in corresponding order to taps at various sectional points along a delay line 13 comprising conventional inductance and capacitance elements labeled L and C. The delay line 13 is terminated in its characteristic impedance R with an output lead 14 coupled to one terminal through a gate 15 which is controlled through pulsing a lead 16. Input pulses are applied to the other terminus of the delay line through a lead 18 and standard capacitor 19 connected to a read-write column address pulse source 20.

As mentioned heretofore, a ferroelectric capacitor may be subjected to an electric field less than the coercive force without shifting its state of polarization significantly when the field is removed. A voltage pulse of a magnitude $E/2$, where E is greater than $E/2$ less than the coercive force, may then be applied through the pulse source 20 and lead 18 and will travel down the delay line 13 subjecting the successive busses $v_1$, $v_2$—$v_n$ and one terminal of the capacitors F connected thereto to such a force in timed sequence according to the delay provided by each section of the line 13, which as before mentioned may be in the order of one quarter microsecond. The cycle of operation in such a system necessarily depends upon the number of delay line sections or corresponding vertical busses and the capacity of the former is limited by the attenuation of the signals. In the illustrated arrangement ten delay line sections are shown with the write or read cycle then divided into ten equal time periods. The pulse source 20 delivers a voltage $\pm E/2$ at the beginning of the cycle and the row address pulse source 11 delivers a voltage $\mp E/2$ to the row *h* selected by the address switch 10 in timed accord with the particular column in which storage is desired and with the polarity selected either for reading or writing. As shown in the timing chart of FIGURE 2*a*, the capacitor in row 1 and column 5 is selected as a particular example for illustrating storage of a binary one. The source 20 delivers a pulse to the delay line 13 at 1 time and the row buss $h_1$ is pulsed at the time the pulse applied to the delay line 13 has progressed to the desired column position, or at 5 time for the example shown, with a total voltage of +E impressed between the terminals of the selected capacitor at that time. An example of reading from a particular storage position is also shown with the same capacitor position used. Here the column address pulse provided by source 20 is $-E/2$ and the row address pulse is $+E/2$ as indicated in dotted lines in the figure. As these pulses coincide at 5 time in the ten increment period provided for reading, a total voltage of −E is impressed across the terminals of the selected capacitor in column 5 and it shifts to a non-stored state of polarization, if in a stored state. If a shift takes place, the capacitance presented to the pulse is high as heretofore described and the pulse on delay line 13 is caused to attenuate, however, if the capacitor F is in a non-stored state and no shift occurs, it has low capacitance and the pulse applied to line 13 is not appreciably diminished. This pulse appears on the output lead 14 as gated through the network 15 during the read cycle and the state of storage of the interrogated capacitor F may be ascertained by a comparison of the magnitude of the output pulse which difference is shown schematically in the timing chart.

Up to this point random read out of a selected capacitor has been described, however, it may be desirable to read out plural capacitor groups as a binary word. This may be accomplished by designating the capacitor F coupled to any one horizontal buss *h* as forming the bits of a word and pulsing a selected *h* word line with a pulse magnitude of −E at one time with the gate 15 opened during the entire read interval. The capacitors F coupled to this line *h* then shift states, if in a one representing state, and the pulses develop at the output in inverse serial order as delayed in steps by the delay line stages.

Employment of two dimensional selection wholly on a time basis is illustrated in FIG. 3 where an array of storage elements is shown comprising a plurality of ferroelectric capacitors F each connected between one of a plurality of vertical busses $V_1$ to $V_n$ and one of a plurality of horizontal busses $H_1$ to $H_n$. As in the previously described embodiment, the capacitor F located between a particular V and H buss may be subjected to an electric field sufficient to exceed the coercive force in either sense by applying a voltage pulse of, for example, $+E/2$ to the selected V buss and $-E/2$ to the selected H buss where E is a voltage greater than the coercive force or that electric field necessary to cause the capacitor to reverse states of polarization. Each of the ferroelectric capacitors F connected to the selected V buss is then subjected to a field of $+E/2$ and each of the capacitors connected to the selected H buss is subjected to a field of $-E/2$, however, as this field alone is insufficient to cause a change in polarization, only that capacitor connected to the intersection of both of the pulsed lines is changed when the pulses terminate.

As before mentioned, selection of the proper H and V busses for the chosen address requires only a single input for each group of H and for each group of V busses and employs a delay line connected at successive stages to the bus terminals with the time of application of both pulses controlling the selection of a particular element.

V input pulses are selectively applied to a terminal 30 and are directed through a lead 31 to one terminal of the primary winding of a pulse transformer 32. The remaining primary terminal of the transformer is grounded to provide a return path for the pulse energy. The secondary of the transformer 32 energizes a delay line 33 comprising an inductance L and capacitance C in each stage as in FIG. 2. The upper terminal of each V buss of the array is connected to the junction of these L and C elements in corresponding order of sequence. The terminus of the delay line 33 is provided by a shunt connected resistor R having a resistance equal to the characteristic impedance of the line so as to prevent reflections.

H selection input pulses are applied to the array at a terminal 40 and are directed through a lead 41 to the primary winding of a pulse transformer 42. The remaining terminal of this winding is also grounded to provide a return path to the H pulse source (not shown). The secondary winding of pulse transformer 42 is connected to reverse the phase of the input pulse and feeds a second delay line 43, which is composed of inductance-capacitance sections similar to those forming the delay line 33, and the H busses are also connected to the junction of the LC elements of corresponding stages in a similar manner.

The busses $H_1$ to $H_n$ pass through a core 44 so that each acts as a single turn primary winding, however, a plurality of turns may be provided for each buss as desired. A further winding 45, functioning as a secondary circuit, embraces the core 44 and develops an induced voltage in response to current flow in any one of the H busses to provide output signal indications as will be described hereafter.

The base of the delay line 33 is connected by a lead 50 to a winding 51 of a further transformer 52. The remaining terminal of winding 51 is coupled to a source of conditioning pulses (not shown) applied to a terminal 53. This terminal is subjected to a conditioning pulse of $+E/2$ magnitude while reading or writing a binary zero and a pulse of $-E/2$ while writing a binary one. The primary 54 of the transformer 52 is grounded at one end and the other terminal 55 is coupled to a source of activating pulses (not shown) of a value $E/2$ as will be described subsequently in connection with FIG. 3*a*.

Initially, each ferroelectric capacitor F is set to a first stable state of polarization as at point "*b*" on the hysteresis curve of FIG. 1. To store a binary digit at a selected position, input pulses are applied to the terminals 30, 40, 53, and 55 at selected times in the cycle of operation of the device. The cycle is divided into time periods, the number and duration of which are regulated by the number of pulses which may be stored in the delay lines 33 and 43 and consequently by the number of H and V busses employed in the storage array. The 10×10 matrix illustrated, requires ten busses in each group and operates on a cycle divided into ten time periods as seen in the timing chart of FIG. 3*a*. A pulse applied to delay line 33 at 1 time arrives at the $V_1$ buss terminal at 1 time, the $V_2$ buss terminal at 2 time, etc. Likewise, a pulse applied to delay line 43 at 1 time arrives at the $H_1$ buss terminal at 1 time, the $H_2$ terminal at 2 time, etc. If a pulse of $+E/2$ magnitude is applied to each of the inputs 30 and 40 at 1 time as shown in the timing chart, the capacitors F located at junction positions $V_1H_1$; $V_2H_2$; $V_3H_3$; $V_4H_4$; etc., are subjected to a potential of magnitude E across their terminals at 1, 2, 3, 4 etc. times, respectively, since the pulse transformer 42 is connected in reverse to transformer 32. At 1 time, each of the capacitors located at positions $V_1H_2$, $V_1H_3$, $V_1H_4$, etc. and at positions $V_2H_1$, $V_3H_1$, $V_4H_1$, etc. are subjected to a potential of $+E/2$ or $-E/2$ at one terminal. At 2 time, each of the capacitors located at positions $V_2H_3$, $V_2H_4$, etc. and $H_2V_3$, $H_2V_4$, etc. are subjected to a potential of $+E/2$ or $-E/2$ at one terminal. During the complete cycle, or at time periods 1 through 10, with each of the pulses V and H simultaneously applied, those condensers F on a diagonal of the matrix are sequentially subjected to a total potential of E across both terminals while the remaining capacitors are subjected to a potential of $+E/2$ or $-E/2$ on one or the other terminal but at no time are potentials due to the pulses applied at terminals 30 and 40 coincident on these remaining capacitors. As observed from FIG. 1 application of a field $+E/2$ or $-E/2$, which is less than the coercive force, produces no net change in the polarization state and, if initially set at point "*b*," those remaining condensers F will be unaffected. The aforementioned diagonal condensers, however, are subjected to a voltage of plus E and would change state sequentially unless prevented by application of other voltages. This inhibiting potential is supplied by the conditioning pulse applied to terminal 53. The conditioning pulse is of $-E/2$ magnitude for writing a binary one, as previously described, and is applied during the complete cycle or from the first through tenth time periods. This causes the net potential applied to those ferroelectric capacitors on the diagonal to be $-E/2$ and sequentially changed to $+E/2$ during the time period each is pulsed. The conditioning pulse of $-E/2$ is also applied to each of the remaining capacitors and, since it is applied to the terminal opposite to that upon which the $-E/2$ pulses are supplied on the V busses it cancels the effect of these pulses and none of the capacitors are subjected to a potential of more than $E/2$ magnitude.

It will be recalled that without the conditioning pulse, the capacitors at locations $V_1H_1$, $V_2H_2$, $V_3H_3$, etc. would have been subjected to an electric field sufficient to change the state of polarization from "*b*" to "*a*" at 1, 2, 3 etc. time periods respectively. Therefore, the effect of the conditioning pulse may be counteracted to allow a binary one to be stored at a selected one of these locations. This is accomplished by applying an activating pulse of $+E/2$ to terminal 55 during the tenth period of the cycle and, for the example given of both the V and H pulse applied at 1 time, the capacitor located at $V_{10}H_{10}$ is selected for storage by the activating pulse at 10 time. To select the capacitor located at $V_9H_9$ and V and H pulses are applied simultaneously at 9 time and progress down their delay lines to column 9 and row 9 respectively when the activating pulse appears.

The description up to this point has considered a simultaneous application of the V and H pulses to terminals 30 and 40 and has allowed selection only of ten addresses by the time of application of these pulses. The remaining ones of the one hundred storage positions provided in the illustrated array are selected by applying the V and H pulses at different times. For example, to select the capacitor located at the junction $H_1V_{10}$, the H pulse is applied at 10 time and V pulse at 1 time. To select the capacitor located at $V_1H_{10}$, the H pulse is applied at 1 time and the V pulse at 10 time. Anyone of the capacitors may, in like manner, be selected for storage by proper timed application of the V and H pulses.

The function of reading is similar to that for writing with the time sequence in selection being identical but with the polarities of the applied V and H pulses reversed along with the conditioning pulse applied to terminal 53 as shown in FIG. 3*a*. This causes those capacitors in a binary one representing state to change state while those in a binary zero representing state remain in that polarized sense. The condition of the particular capacitor that is interrogated is determined by the effect of the switching action on the busses associated with the delay line.

As pointed out in connection with FIG. 1, a ferroelectric capacitor exhibits a much greater capacitance during switching from one to the other of its stable states as the capacitance is proportional to the slope of the hysteresis curve traversed.

If a capacitor is in a zero state of polarization and a field of $-E$ is applied, it presents a low capacitance while if it is in a one state of polarization it must switch to the zero state. During switching, the capacitor cannot charge to the opposite polarity instantaneously and a large current pulse flows between the V and H busses coupling its terminals. This current flow through the H buss induces a magnetomotive force in the read out core 44 which is detected in the output winding 45. It is thus seen that the sensing core 44 may be arranged to embrace either the V or H busses with equal effect since the current pulse flows between them and they are momentarily in the same low resistance circuit. Read out of a binary one in the addressed capacitor F produces a relatively large output pulse whereas read out of a binary zero produces a low magnitude output pulse which conditions may be readily distinguished by conventional means or observed on an oscilloscope.

Saturable magnetic core storage elements may be employed in the systems of FIGS. 2 or 3 and connected as shown in FIG. 4. In this case when the pulses are selectively applied to the coordinate input terminals and coincide at a particular buss junction at some interval in the operation cycle, that winding linking the particular V and H buss is subjected to a voltage of $\pm E$ magnitude and a magnetomotive force greater than the coercive force of the core is provided for read in or read out. Read out of a binary 1 causes a shift in remanence state of the core and the winding presents a high impedance to these pulses. As a consequence, with the arrangement of FIG. 3 using cores, only a low magnitude current flows through the H buss or the primary winding of the output transformer core 44. On the other hand, if the core selected is in a zero state the winding presents a low impedance and a pulse of greater magnitude is developed. It is to be noted that this is just the reverse of the situation where ferroelectric capacitor storage elements are employed.

Delay line selection has been illustrated with the delay stages comprising standard type inductance capacitance sections, however, it is to be understood that other delay means may be used with equally desirable results. For example, a mercury delay line having a piezoelectric crystal input and output elements may be employed. Further, it is contemplated that other detection means may be incorporated using the delay lines terminated in other than their characteristic impedance so that reflections from such a terminus are developed at the input end and are delivered in true rather than complementary positions in serial sequence when a word line is read out.

A particular delay line modification is illustrated in FIG. 5 and may be employed in substitution for the delay lines 33 and 43 as shown in FIG. 3. This arrangement employs the principle of wave propagation in a ferroelectric material as a means of converting to the time domain; the velocity of propagation in barium titanate, for example, being $1.4\times10^5$ inches/sec.

The structure comprises an elongated body of ferroelectric material 60 to which spaced electrodes or output terminals 61 are affixed, the spacing of these electrodes determining the time spacing of controlling pulses directed to the coordinate busses. An operating pulse is applied from a source 62 to a further electrode 63 which is affixed to a piezoelectric crystal 64 and the change in dimensions of the latter are adapted to develop a sonic wave which passes along the length of the crystal 60 and, through the piezoelectric action of the ferroelectric barium titanate, causes a voltage to be developed at successive ones of the electrodes 61. The polarity of the developed voltage pulses depends upon the state of polarization of ferroelectric bar 60 and this may be controlled for selectively providing reading and writing pulses by means of an electrode 65 which is affixed to one surface of the element 60 throughout its length and adapted to be pulsed by a source 66 or 67 of opposite polarity and of sufficient magnitude to reverse its polarization state at the desired read or write cycle interval.

Since the sonic wave developed by the crystal 64 does not change the established polarization state of the ferroelectric material 60, successive pulses may be applied by the source 62 without requiring operation of either source 66 or 67 in those instances when successive reading or writing operations are to be performed.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An addressing system for a ferroelectric capacitor storage array wherein said capacitors are capable of assuming one or the other of two stable states of polarization in response to the polarity sense of an electric field applied across the terminals thereof, said capacitors being arranged in rows and columns with a buss provided for each row and a buss provided for each column and one terminal of each ferroelectric capacitor connected to a corresponding row buss and the other terminal connected to the corresponding column buss, means for applying differentially timed electrical pulses of desired polarity to said busses to cause selected ones of said ferroelectric capacitors to shift its state of polarization in storing and in reading out binary information, said means comprising a first plural stage pulse delay line means coupled at successive corresponding stages to terminals of said row busses and a second pulse delay line means coupled in like manner to corresponding terminals of said column busses with the pulses applied to said delay line means at timed intervals of an operating cycle so as to be coincident at the terminals of selected ones of said capacitors, means for applying a conditioning pulse to said first delay line means throughout said operating cycle, and means for applying an activating pulse to said first delay line means at a fixed time interval of said operating cycle whereupon said differentially timed impulses are effective to cause only one of said selected capacitors to change its polarization state, a magnetic core transformer associated with said row busses whereupon said row busses function as individual primary windings, and a secondary winding associated with said transformers and adapted to sense a shift in polarization state during read out pulsing of a selected capacitor.

2. An addressing system for a ferroelectric capacitor storage array as set forth in claim 1 wherein said first and second pulse delay line means comprise an elongated body of barium titanate, a piezoelectric crystal affixed to one end of said body, said crystal being adapted to deliver a compressional wave along said body toward the other end thereof, a plurality of spaced electrodes affixed to said body along its length whereupon said compressional wave causes a potential to develop at successive ones of said electrodes during the interval that it passes that region of the body of barium titanate adjacent thereto, means coupled to said body for selectively establishing one or the other polarization state therein and comprising further electrodes coupled to said body, the polarity of said developed potential being determined by the state of polarization of said body.

3. An addressing system for a ferroelectric capacitor storage array wherein said capacitors are capable of assuming one or the other of two stable states of polarization in response to potentials applied to terminals thereof, said capacitors being arranged in rows and columns with a buss provided for each row and a buss provided for each column of the array and with one terminal of each said capacitor connected to a corresponding row buss and the other terminal connected to the corresponding column buss, means for applying potentials of alternate polarity to said busses to cause selected ones of said ferroelectric capacitors to shift state of polarization in storing and in reading out binary information, said means comprising a first plural stage pulse delay line coupled at successive corresponding stages to terminals of said row busses and a second pulse delay line coupled in like manner to corresponding terminals of said column busses, means for applying pulses to said delay lines at timed intervals whereupon said pulses are coincident at selected ones of said capacitors, and further means for applying other pulses to said first delay line to cause the coincident application of said aforementioned pulses to be effective in causing only one of said selected capacitors to change polarization states.

4. An addressing system for a ferroelectric capacitor storage array wherein said capacitors are capable of assuming one or the other of two stable states of polarization in response to potentials applied to terminals thereof, said capacitors being arranged in rows and columns with a buss provided for each row and a buss provided for each column and one terminal of each said capacitor connected to a corresponding row buss and the other terminal connected to the corresponding column buss, means for applying electrical pulses of alternate polarity to said busses to cause selected ones of said ferroelectric capacitors to shift state of polarization in storing and in reading out binary information, said means comprising a first plural stage pulse delay line coupled at successive corresponding stages to terminals of said row busses and a second pulse delay line coupled in like manner to corresponding terminals of said column busses with the pulses applied to said delay lines at timed intervals so as to be coincident only at the terminals of selected ones of said capacitors, further means for applying other pulses to said first delay line to cause the coincident application of said aforementioned pulses to be effective in causing only one of said selected capacitors to change polarzation states, a magnetic core transformer associated with said row busses whereupon said row busses function as primary windings, and a secondary output winding associated with said transformer and adapted to detect a change in the polarization state of selected ferroelectric capacitors on application of pulses of reading polarity to said delay lines.

5. An addressing system for a storage matrix comprising an array of memory elements each capable of assuming one or the other of two stable conditions to represent binary information in response to the application of electrical impulses of predetermined polarity and magnitude, said elements being arranged in coordinate rows and columns with a plurality of busses including one buss for each row and one buss for each column of said array and each memory element forming a two terminal device coupled to the corresponding row and column buss, means for applying electrical impulses of selected polarity to said busses to cause selected ones of said memory elements to change from one to the other stable condition, said means comprising a plural stage pulse delay line coupled to each of said column busses at corresponding successive stages and including further means for applying a differentially timed electrical impulse to at least one of said row busses whereupon said impulses are coincident across the terminals of selected ones of said memory elements and effective to cause a change therein from one to the other stable condition of storage, said pulse delay line comprising an elongated body of ferroelectric barium titanate material, a piezoelectric crystal affixed to one end of said body, said crystal being adapted to deliver a sonic wave along said body toward the other end thereof, a plurality of spaced electrodes to which said busses are connected affixed to said body along its length whereupon said sonic wave causes a potential to develop at successive ones of said electrodes and busses as it passes that region of the body adjacent thereto, the polarity of said potential being determined by the state of polarization of said body.

6. An addressing system for a ferroelectric storage matrix comprising an array of ferroelectric capacitors each capable of assuming alternate stable states of polarization and arranged in rows and columns, a plurality of busses including one buss for each row and one buss for each column of said array with one terminal of each capacitor connected to the corresponding row buss and the other terminal connected to the corresponding column buss, means for applying electrical impulses to said busses effective to cause selected ferroelectric capacitors to change from one to the other state of polarization, said means comprising a plural stage pulse delay line connected to each of said row busses at corresponding successive stages and a further pulse delay line connected to each of said column busses at corresponding successive stages whereby differentially timed pulses applied to said delay lines are coincident only across the terminals of selected ones of said capacitors, said pulse delay lines comprising an elongated body of ferroelectric barium titanate material, a piezoelectric crystal affixed to one end of said body, said crystal being adapted to deliver a sonic wave along said body toward the other end thereof, a plurality of spaced electrodes coupled to corresponding busses and affixed to said body along its length whereupon said sonic wave causes a potential to develop at successive ones of said electrodes as it passes that region of the body adjacent thereto, the polarity of said potential being determined by the state of polarization of said body.

References Cited in the file of this patent

UNITED STATES PATENTS

| | | |
|---|---|---|
| 2,635,229 | Gloess | Apr. 14, 1953 |
| 2,717,373 | Anderson | Sept. 6, 1955 |
| 2,736,880 | Forrester | Feb. 28, 1956 |
| 2,736,881 | Booth | Feb. 28, 1956 |
| 2,750,580 | Rabenda | June 12, 1956 |
| 2,769,968 | Schultheis | Nov. 6, 1956 |
| 2,806,155 | Rotkin | Sept. 10, 1957 |
| 2,931,014 | Buchholz | Mar. 29, 1960 |